United States Patent
Binder et al.

(10) Patent No.: US 7,208,037 B2
(45) Date of Patent: Apr. 24, 2007

(54) MOLDING COMPOUND, USE THEREOF AND A METHOD FOR PRODUCING AN OXIDE-CERAMIC SINTERED BODY

(75) Inventors: Joachim Binder, Karlsruhe (DE); Jürgen Hausselt, Germersheim (DE); Hans-Joachim Ritzhaupt-Kleissl, Waldorf (DE); Kirsten Honnef, Freiburg (DE); Shikha Ray, Karlsruhe (DE); Volker Hennige, Dülmen (DE)

(73) Assignee: Forschungszentrum Karlsruhe, GmbH, Karlsruhe (DE)

( * ) Notice: Subject to any disclaimer, the term of this patent is extended or adjusted under 35 U.S.C. 154(b) by 406 days.

(21) Appl. No.: 10/363,984

(22) PCT Filed: Jul. 31, 2001

(86) PCT No.: PCT/EP01/08837

§ 371 (c)(1), (2), (4) Date: Aug. 4, 2003

(87) PCT Pub. No.: WO02/20425

PCT Pub. Date: Mar. 14, 2002

(65) Prior Publication Data

US 2004/0012127 A1 Jan. 22, 2004

(30) Foreign Application Priority Data

Sep. 8, 2000 (DE) ................ 100 44 605

(51) Int. Cl.
*A61C 13/083* (2006.01)

(52) U.S. Cl. .................. 106/35; 106/272; 501/96.3

(58) Field of Classification Search ........... 501/96.3; 106/272, 35
See application file for complete search history.

(56) References Cited

U.S. PATENT DOCUMENTS

| 3,027,332 A | * | 3/1962 | Medin .............. 252/519.31 |
| 4,332,909 A | * | 6/1982 | Nishida et al. .......... 501/97.2 |
| 4,407,971 A | * | 10/1983 | Komatsu et al. ......... 501/96.3 |
| 5,178,647 A | * | 1/1993 | Komatsu et al. ......... 51/307 |
| 5,213,730 A | * | 5/1993 | Hida ................ 264/624 |
| 2005/0172857 A1 | * | 8/2005 | Winter .............. 106/35 |

FOREIGN PATENT DOCUMENTS

| DE | 44 07 760 A | 9/1995 |
| DE | 195 47 129 C | 1/1997 |
| DE | 44 07 760 C2 | 5/2000 |

OTHER PUBLICATIONS

Patent Abstracts of Japan, vol. 014, No. 184 (C-0709), Apr. 13, 1990 & JP 02 030656 A (Kawasaki Refract Co Ltd), Feb. 1, 1990.

* cited by examiner

*Primary Examiner*—David M. Brunsman
(74) *Attorney, Agent, or Firm*—Venable LLP; Robert Kinberg; Ryan M. Flandro

(57) ABSTRACT

The invention proposes to produce a mixture that is shrink-resistant, or has a freely selectable degree of shrinkage, and can be used as a molding compound, and a method for producing a corresponding oxide-ceramic sintered body. The molding compound comprises an intermetallic compound and a wax. In the method for producing an oxide-ceramic sintered body, a green body is molded from a molding compound of this type, dewaxed and sintered in an oxidizing atmosphere to form a ceramic sintered body. The molding compound is suited for producing dentures and dental fillings.

3 Claims, No Drawings

MOLDING COMPOUND, USE THEREOF AND A METHOD FOR PRODUCING AN OXIDE-CERAMIC SINTERED BODY

This application is a 371 of PCT/EP01/08837, filed 31 Jul. 2001.

BACKGROUND

1. Field of the Invention

The invention relates to a molding compound and a method for producing an oxide-ceramic sintered body.

2. Related Art

DE 195 47 129 C1 discloses a mixture and a method for producing shrink-resistant ceramics. The mixture described here comprises a powdered oxide ceramic, a powdered, intermetallic compound and an organosilicon polymer. This mixture forms a green body that can be sintered in an oxidizing atmosphere without shrinking.

SUMMARY OF THE INVENTION

It is the object of the invention to modify the known mixture such that it performs better as a molding compound, particularly a low-pressure injection-molding compound. The invention further proposes a method for producing a shrink-resistant sintered body and a possible application for the molding compound.

DETAILED DESCRIPTION

According to the invention, the organosilicon polymer proposed in the cited DE 195 47 129 C1 is replaced, completely or partially, with a wax, preferably a paraffin. As in the known mixture, an oxide ceramic may be present as a third component, in addition to the intermetallic compound and the wax; oxide-ceramic sintered bodies can, however, be produced only from the intermetallic compound and the wax.

The following definition of waxes can be found in the CD-ROM version 1.0 of the Römpp Chemie Lexikon [Chemical Lexicon], Stuttgart/New York, Georg Thieme Verlag [publisher], 1995. Basically, all of the waxes that fall under this definition and are listed here are suitable for producing the molding compounds; paraffins are also particularly well suited, however.

If the molding compound is to be sintered into a highly stable oxide ceramic, a high sintering density, preferably more than 95% of the theoretically attainable density, is required. For this purpose, two prerequisites must be met:

(i) A high filler content in the molding compound. This is attained through a surface modification of the intermetallic phase, particularly with a silane jacket.

(ii) A high sintering density. This can be attained through the addition of auxiliary sintering agents, such as inorganic alkali or alkaline-earth compounds such as $Li_2O$.

The composition of the molding compound, i.e., the components of intermetallic phase, wax and possibly oxide ceramic, are selected in accordance with the above-cited DE 195 47 129 C1 such that the sintering shrinkage of the body sintered into an oxide ceramic in an oxidizing atmosphere can either be minimized or set at a predetermined value. Thus, shrink-free sintered bodies or bodies having a selected shrinkage can be produced from the molding compound.

In contrast to the molding compound from the cited DE 195 47 129 C1, the molding compound of the invention has the notable advantage that waxes, particularly paraffins, are considerably less expensive than organosilicon polymers. Moreover, they possess the following advantageous features:

the option of completely omitting the oxide ceramic;
improved handling;
a lower processing temperature (from ambient temperature to about 80° C.);
a high filling component of the intermetallic phase;
the ability to be poured or sprayed without solvents; and
the ability to be used in an impression method to produce precisely detailed replicates.

The molding compound can be used to produce high-quality green bodies, through injection molding, particularly low-pressure injection molding, through second casting or through replication, wax molding or other known molding methods. Such bodies cannot be produced with the known mixture and the known method.

In the method of the invention, after the green body has been produced at temperatures of, for example, 40° C. to 200° C., the wax is melted out; the liquid wax can be collected and reused, if necessary. The high filler content that can be achieved, for example, by the silanization of the intermetallic phase allows an especially tight interlocking of the powder particles, so the dewaxed green body retains its original shape.

After the dewaxing process, the green bodies are sintered in a known manner in an oxidizing (oxygen-containing) atmosphere, without shrinking, to form oxide-ceramic bodies. The maximum sintering temperatures used in the heating process in the oxidizing atmosphere can be between 1000° C. and 1650° C.

Because the molding compound and the method can attain an exact reproduction, the molding compound is particularly suited for use in dentistry, for example for dentures and ceramic dental fillings.

The invention is described in further detail below by way of two examples. In both instances, the produced ceramic components virtually cannot be distinguished from the green body in dimension, and are thus sintered without shrinkage.

EXAMPLE 1

75.42 g of zirconium silicide are attrition-ground for two hours in ethanol. Afterward, 74.58 g of tetragonally stabilized zirconium dioxide are added, and the mixture is ground and mixed for an hour in the attritor. The powdered mixture is dried in a vacuum, then left in a drying oven for two hours at 120° C.

9.666 g of paraffin and 1.568 g of PEG(2)stearylether (PEG: Polyethylene glycol) are melted at 80° C. Then, 100 g of the prepared powdered mixture are stirred into this wax mixture, and homogenized at 90° C. for three hours.

The resulting compound can easily be molded in silicon molds without bubbles at 120° C. The unmolded green bodies are released without cracks at 500° C., and the attained brown bodies are dense-sintered at 1550° C. to form the finished component.

EXAMPLE 2

The powdered mixture prepared as in Example 1 is pretreated to form a hot-pour compound prior to being processed.

To this end, 285 ml of ethanol are mixed with 15 ml of deionized water and 3 ml of acetic acid and stirred. Then, 5.59 g of n-octyltriethoxysilane are added. Afterward, 100 g of the powdered mixture prepared as in Example 1 are added to the clear solution, and held in suspension for 30 minutes. The powder is, again, dried in a vacuum and left in a drying oven for two hours at 120° C. The re-processing to form a hot-pour molding compound, as in Example 1, follows.

The invention claimed is:

1. A method for producing an oxide-ceramic denture or an oxide-ceramic dental filling, the method comprising:
    providing a homogeneous mixture of a powdered intermetallic compound and a paraffin;
    adding $Li_2O$ to the homogeneous mixture as a sintering aid;
    molding a green body from the homogeneous mixture;
    removing the paraffin from the molded green body; and
    after removing the paraffin from the molded green body, sintering the green body in an oxidizing atmosphere to form the oxide-ceramic denture or the oxide-ceramic dental filling.

2. The method of claim 1, wherein the homogeneous mixture further includes an oxide ceramic as an additional component.

3. The method of claim 1, wherein the surface of the powdered intermetallic compound is coated with a silane.

* * * * *